June 15, 1926.

F. LJUNGSTRÖM 1,588,970

LOCOMOTIVE COMPRISING TWO CARS

Filed August 3, 1922

Inventor
F. Ljungström

Patented June 15, 1926.

1,588,970

UNITED STATES PATENT OFFICE.

FREDRIK LJUNGSTRÖM, OF LIDINGO-BREVIK, SWEDEN, ASSIGNOR TO AKTIEBOLAGET LJUNGSTROMS ANGTURBIN, OF STOCKHOLM, SWEDEN, A CORPORATION.

LOCOMOTIVE COMPRISING TWO CARS.

Application filed August 3, 1922, Serial No. 579,547, and in Sweden March 24, 1922.

In locomotives comprising two cars, it has been proposed to connect the cars in such a manner that a definite pivot is obtained. Difficulties have then arisen, particularly in greater locomotives, in arranging a driving set located between these two cars in such a manner that the desired distribution of the wheel pressure is attained. In greater cars it has also been necessary to mount the two cars on bogies, difficulties having then been encountered in arranging leading wheels for the driving wheels, and in so arranging the driving set and the bogies that the guiding pressures produced on the driving wheels would be the most suitable and not exceed a dangerous value, while the wheel pressures would be sufficiently great.

The present invention has for its purpose to remove these difficulties, and it principally consists therein that some or all of the rear wheels of the leading car are gathered together with some or all of the front wheels of the trailing car in a common bogie which is movable with respect to the two cars carried thereby.

Figure 1:
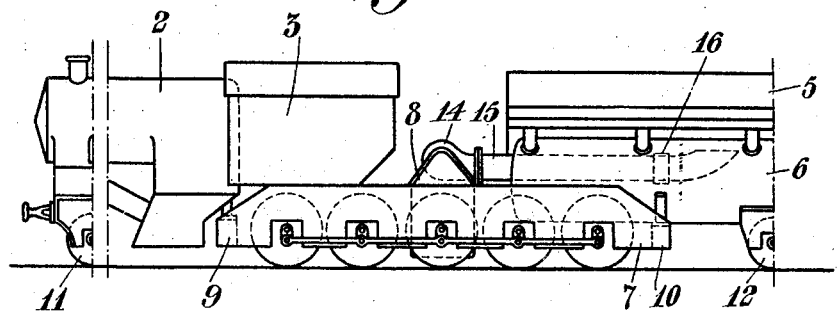
Figure 2:
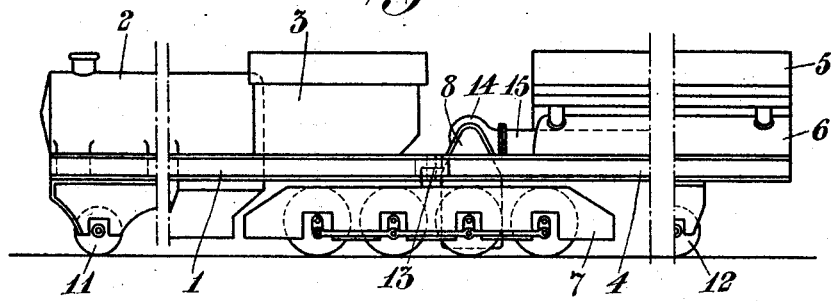
Figure 3:
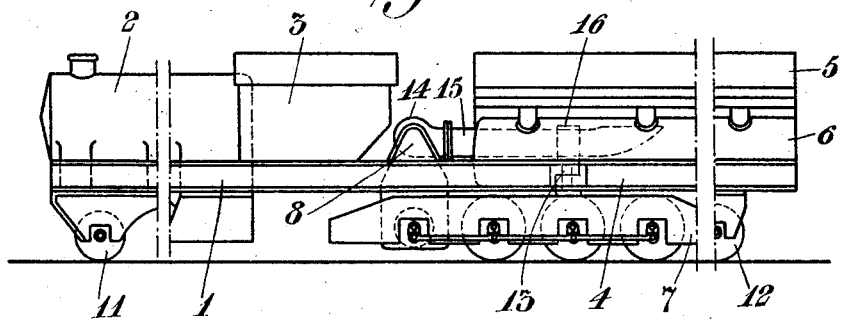

The invention is illustrated in the accompanying drawing. Figs. 1, 2 and 3 show diagrammatically three embodiments thereof, all of which consist of a leading boiler car and a trailing condenser car on which the driving motor (the turbine) is arranged.

Figure 4:
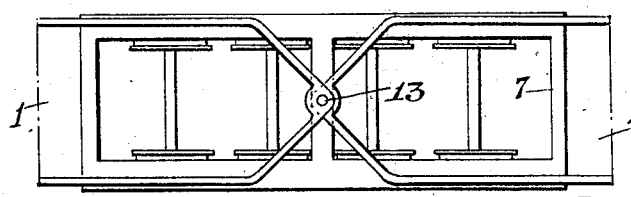

Fig. 4 illustrates the manner in which the two vehicles according to the embodiment shown in Fig. 2 are mounted on the common bogie, only the frames of the two vehicles being shown.

In all figures, 1 denotes the leading car which carries the boiler 2 and the driver's cab 3 of the locomotive, 4 designates the trailing car which carries the air-cooled condenser 5 of the locomotive and a liquid container 6 situated underneath the condenser. The two cars 1 and 4 are mounted on a bogie 7 which is constituted by a frame containing the rear wheels of the leading car 1 and the front wheels of the trailing car 4. All of these wheels are shown in the drawing as driving wheels driven from the driving set 14 of the locomotive, said driving set consisting for instance of a steam turbine from which the motion is transmitted to the driving wheels by means of coupling rods through the medium of one or more gearings 8 and, if found suitable, through a lay shaft. The leading car 1 is mounted at its fore end on a pair of wheels 11 serving as leading wheels. This pair of wheels 11 may also be replaced by a bogie comprising one or more pairs of wheels. The trailing car 4 is likewise mounted at its rear end on a pair of wheels 12 which may also be replaced by a bogie provided with any suitable number of wheels.

In the embodiment shown in Fig. 1, the two cars 1 and 4 are mounted, as at 9 and 10 respectively, on a bogie 7 under the same, whereby the two cars will rotate in curves relatively to the bogie 7. In this embodiment, the frame 4 of the trailing car is constituted by the condenser receptacle 6 arranged on this car.

According to the embodiment shown in Figure 2, the frames of the two cars 1, 4 are coupled together directly and mounted on a common pivot 13 disposed on the common bogie 7 and situated between the two cars, (see particularly Fig. 4), whereby only one axis of rotation is obtained between the cars, which is advantageous with respect to the extending of the pipings from the one car to the other. The driving set 8 is preferably located in this place 13.

According to Figure 3, the cars are coupled together and mounted on the common pivot 13 on the bogie 7 in a manner similar to that in Figures 2 and 4, said pivot 13 in this embodiment being situated underneath the condenser receptacle 6.

The connection between the toothed gearing of the steam motor, the driving wheels and the condenser may be arranged in various ways. When a bogie is used, as in the present case, a movable connection must evidently be provided between some of the above-mentioned parts. If the steam motor in its entirety is carried by the bogie, the same being thus adapted to be rigidly connected with the toothed gearing and the driving arrangement, a movable connection must be arranged between the same and the condenser.

In the embodiment shown in Fig. 1, the piping 15 extends from the steam motor 14 into the condenser receptacle 6 with which it is movably connected by means of a spherically movable and tightening coupling 16 which is preferably arranged immediately above the bearing point 10 of the car on the bogie 7.

If the driving set is disposed above the common pivot 13, as in Fig. 2, the spherical coupling may be preferably arranged beside the steam motor 14 above the pivot 13.

In the embodiment shown in Fig. 3, the movable coupling 16 is arranged, as in Fig. 1, above the bearing point 13 of the car on the bogie 7.

Obviously, a number of modifications of the invention may be conceived. For instance, the driving set may be disposed in another place on the locomotive, and the bogie 7 may have another shape than what is shown diagrammatically in the drawing, it being for example provided with a greater or lesser number of wheels than shown, all of which need not be driving wheels. With a locomotive constructed according to the invention and comprising two cars mounted on a bogie, it is possible to distribute the wheel pressures and the guide pressures better than hitherto. Such a locomotive may also pass through curves having comparatively small radii, which is necessary in switching in the locomotive on tracks at stations, locomotive sheds, etc., whereby locomotives with great driving capacity may thus be built with a reasonable length without becoming inconvenient.

What I claim as new and desire to secure by Letters Patent of the United States is:—

1. A locomotive comprising two connected vehicles in which the leading vehicle carries the boiler and the trailing vehicle a condenser pertaining to said locomotive, at least one pair of the rear wheels of the leading vehicle being embodied together with at least one pair of the front wheels of the trailing vehicle in a common bogie, said common bogie being movable with respect to the two vehicles carried thereby and carrying a steam turbine device and a toothed gearing connected thereto and transmitting motion from the steam turbine to the driving wheels of the locomotive.

2. An arrangement according to claim 1, characterized by the two vehicles being mounted on the common bogie in or approximately in the point in which they are coupled together.

3. An arrangement according to claim 1, characterized by the two united vehicles being mounted on the common bogie in a place situated between the two vehicles.

In testimony whereof I affix my signature.

FREDRIK LJUNGSTRÖM.